United States Patent
Watanabe et al.

(10) Patent No.: US 7,448,298 B2
(45) Date of Patent: Nov. 11, 2008

(54) VISCOUS DAMPER

(75) Inventors: Hideaki Watanabe, Saitama (JP); Kazumi Ohki, Saitama (JP); Takashi Yoshida, Saitama (JP); Masakazu Isono, Saitama (JP)

(73) Assignee: Fukoku Co., Ltd., Ageo (JP)

( * ) Notice: Subject to any disclaimer, the term of this patent is extended or adjusted under 35 U.S.C. 154(b) by 542 days.

(21) Appl. No.: 10/514,551

(22) PCT Filed: May 30, 2003

(86) PCT No.: PCT/JP03/06890

§ 371 (c)(1),
(2), (4) Date: May 24, 2005

(87) PCT Pub. No.: WO03/102442

PCT Pub. Date: Dec. 11, 2003

(65) Prior Publication Data
US 2005/0235943 A1    Oct. 27, 2005

(30) Foreign Application Priority Data

May 31, 2002 (JP) ............................ 2002-159193
Apr. 11, 2003 (JP) ............................ 2003-108368

(51) Int. Cl.
*F16C 15/00* (2006.01)
*F16F 15/16* (2006.01)

(52) U.S. Cl. ................. 74/573.1; 74/572.2; 74/604

(58) Field of Classification Search .............. 74/572, 74/573.12, 572.1, 573.1; 411/544; 280/602; 188/290; 29/893.33; *F16C 15/30*; *F16F 15/30*
See application file for complete search history.

(56) References Cited

U.S. PATENT DOCUMENTS

| | | | | |
|---|---|---|---|---|
| 3,285,096 | A * | 11/1966 | O'Connor | 74/573.1 |
| 3,823,619 | A * | 7/1974 | Shotwell | 74/573.12 |
| 4,172,510 | A * | 10/1979 | Forkel | 188/379 |
| 4,481,840 | A * | 11/1984 | Friedericy et al. | 74/572.1 |
| 4,615,237 | A * | 10/1986 | Forkel | 74/573.1 |
| 4,627,635 | A * | 12/1986 | Koleda | 280/602 |
| 5,489,180 | A * | 2/1996 | Ichihara et al. | 411/544 |
| 7,028,403 | B2 * | 4/2006 | Takahashi et al. | 29/893.33 |
| 7,357,230 | B2 * | 4/2008 | Kojima et al. | 188/290 |

(Continued)

FOREIGN PATENT DOCUMENTS

EP    0 013 129    *    7/1980

(Continued)

*Primary Examiner*—Vinh T. Luong
(74) *Attorney, Agent, or Firm*—Arent Fox LLP

(57) ABSTRACT

A viscous damper having an annular inertial mass body received in a case together with a damping liquid, and a hub for fixing the case on the rotary shaft of an internal combustion engine. The case including a case main body of substantially U-shaped cross section, and a cover for liquid-tightly closing an opening directed to one axial side of the main body, and defining a sealed chamber in the inside. The inertial mass body is made by superposing and joining a plurality of annular plates. By thrust bearings attached in holes in the annular plate on body axial sides of the inertial mass body and by a journal bearing attached in a recessed groove in the inner periphery of the inertial mass body, the inertial mass body is supported both axial sides and radially and disposed for peripheral rotation in the sealed chamber.

4 Claims, 5 Drawing Sheets

U.S. PATENT DOCUMENTS

2003/0029269 A1 * 2/2003 Gabrys .................. 74/572

FOREIGN PATENT DOCUMENTS

| JP | 2579119 | | 6/1992 |
| JP | 8-200449 | * | 8/1996 |
| JP | 11-230255 | * | 8/1999 |
| JP | 2000-161439 | * | 6/2000 |
| JP | 2003-28243 | * | 1/2003 |

* cited by examiner

FIG.10A
FIG.10B
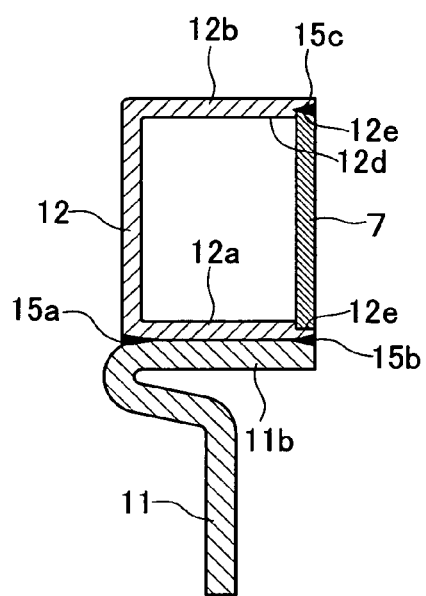
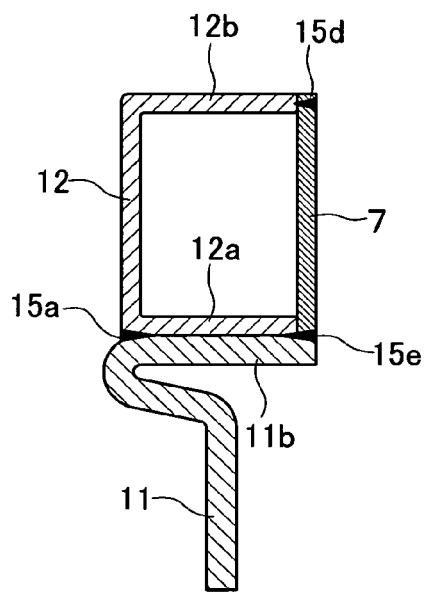
FIG.11
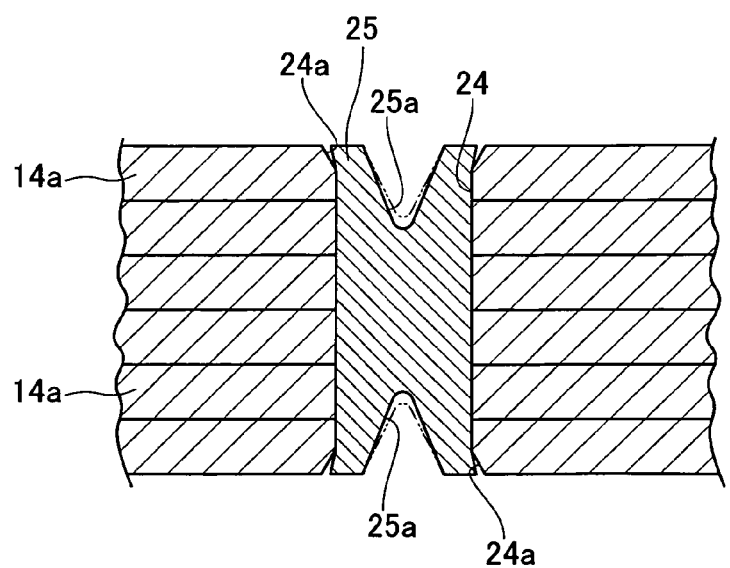

VISCOUS DAMPER

CROSS-REFERENCE TO RELATED APPLICATION

This application is a National Stage entry of International Application No. PCT/JP03/06890, filed May 30, 2003, the entire specification claims and drawings of which are incorporated herewith by reference.

TECHNICAL FIELD

The present invention relates to a viscous damper mounted on a shaft of an internal combustion engine such as an engine of an automobile.

BACKGROUND ART

As shown in FIG. 12, a viscous damper for absorbing a torsional vibration of a crankshaft of an internal combustion engine includes a case 3 with an opening 2a provided at one side in an axial direction of an annular case body 2 substantially U-shaped in section being closed with a cover 7 to be liquid-sealed, and an annular inertia mass element 4 housed with a damping liquid (not shown) inside the case 3, and the viscous damper is fixed with a bolt to a revolving shaft 1 of the internal combustion engine via a mounting portion 2c integrally formed at the case body 2.

Inside the case 3, a closed chamber 2b is defined by the case body 2 and the cover 7, the inertia mass element 4 is placed rotatably in a circumferential direction in the closed chamber 2b with its both sides in an axial direction being supported by thrust bearings 5, and with an inner circumferential surface of the inertia mass element 4 being supported by a journal bearing 6.

The thrust bearing 5 is constituted of a disc of a material with lubricity such as a nylon resin, and is mounted by being fitted in a shallow mounting hole 8 formed on both side surfaces in a diameter direction of the inertia mass element 4. The thrust bearings 5 abut to an inner surface of an orthogonal wall at an opposite side from an open side of the case body 2 and an inner surface of the cover 7, and rotatably support the inertia mass body 4 in a circumferential direction with a fixed narrow clearance being kept between these inner surfaces. The journal bearing 6 is constituted of an annular ring of a nylon resin or the like, and formed to be an open ring cut at one spot. The journal bearing 6 is placed between an inner circumferential surface of the inertia mass element 4 and an inner surface of an inner circumferential wall of the case body 2, and supports the inertia mass element 4 rotatably in the circumferential direction with a fixed narrow clearance being kept from the inner surface (refer to, for example, Japanese Utility Model No. 2579119).

In order to obtain a desired damping characteristic, this viscous damper needs to adjust the inertia mass element 4 correspondingly to the characteristic of the internal combustion engine to which the viscous damper is applied, and if the inertia mass element 4 is changed, the case body 2 and the cover 7 need to be changed. The inertia mass element 4 is generally formed by casting due to less waste of the material and its suitability for mass production, and if the inertia mass element is changed, the casting die has to be changed.

The damping force of a viscous damper is derived from occurrence of a shear resistance force to the damping liquid with high viscosity existing between the case 3 and the inertia mass element 4 when a relative speed difference between the case 3 and the inertia mass element 4 occurs, and therefore the damping force is influenced not only by the dimension of the clearance between the case 3 and the inertia mass element 4 but also by the conditions of the inner surface of the case 3 and the outer surface of the inertia mass element 4 to a large extent. Consequently, the cast inertia mass element needs finishing work on its surface by cutting or the like, and therefore the production process is complicated.

For this reason, the development of a viscous damper with excellent general versatility, easy to produce and capable of reduction in the production cost is desired.

Accordingly, an object of the present invention is to provide a viscous damper improved in general versatility, easy to produce, and capable of reduction in the production cost.

DISCLOSURE OF INVENTION

In order to solve the above-described problem, the present invention is a viscous damper comprising a case with an opening toward one side in an axial direction of an annular case body substantially U-shaped in section being closed with a cover to be liquid-sealed, which is fixed to an revolving shaft of an internal combustion engine, an annular inertia mass element housed with a damping liquid inside the case, and support means for rotatably supporting the inertia mass element in a circumferential direction inside the case, characterized in that the inertia mass element is formed by overlaying a plurality of annular plates on each other and bonding them.

In the viscous damper of the present invention, a plurality of annular plates are laminated to form the inertia mass element, and therefore the mass of the inertia mass element can be easily adjusted by increasing and decreasing the number of annular plates to be laminated, increasing and decreasing the specific gravity of the annular plates, and the like. Accordingly, the mass adjustment of the inertia mass element corresponding to the vibration characteristic of the internal combustion engine to which the viscous damper is applied can be facilitated, and general versatility of the viscous damper can be further improved.

Mounting of the thrust bearings as the support means of the inertia mass element can be easily performed by punching out the mounting holes on the annular plates on both sides of the inertia mass element. Mounting of the journal bearing can be easily performed by providing a concave groove on an inner circumferential portion of the inertia mass element by reducing the inner diameter of the annular plates at the center part of the inertia mass element.

An adhesive, pin and the like can be used for bonding the laminated annular plates, but in order to improve productivity, it is preferred to form the engaging pieces at the annular plates and mechanically bond them by a press. According to the present invention, cut-and-bent pieces are formed on a surface of the annular plate with spaces between them in a circumferential direction, and by overlaying a plurality of annular plates on each other so that the cut-and-bent pieces are overlaid on each other and pressing them, the plurality of annular plates can be bonded to each other. Alternatively, dowels protruded from one surface of the annular plate to the other surface are formed on the aforesaid annular plate with spaces between them in a circumferential direction, and by overlying a plurality of annular plates on each other so that the dowels are displaced in the circumferential direction, and pressing them, the plurality of annular plates can be bonded. In this case, it is preferred that a convex portion of the dowel is formed to be narrower than a concave portion. In doing so, the bite of the convex portion into the surface of the annular plate becomes sharp and biting force increases, and bonding strength of the annular plates to each other is enhanced. In addition, the shape stability of the obtained inertia mass body is improved.

According to the present invention, it is preferred that the annular plate is formed by joining a plurality of arc-shaped ring pieces in an annular form. The annular plate may be punched out in its entirety by a press, but if a plurality of parts are assembled to form the annular plate, waste of the material can be reduced. According to the present invention, a plurality of ring pieces are placed in an annular form, and by close-fitting a protruded piece formed at one end of one ring piece of the adjacent ring pieces into a hole formed at a corresponding one end of the other ring piece, a plurality of ring pieces are joined in the annular form. In this case, a concave portion can be formed at least at one side of a base portion of the protruded piece of the ring piece, and a protruded portion fitted in the concave portion is formed at a corresponding side of an open end of the hole. Thus, even if the hole is pressed to expand by the protruded piece on press-fitting of the protruded piece and the hole, deformation is pressed down and absorbed at the fitting portion of the convex portion of the base of the hole and the concave portion of the base of the protruded piece, and therefore the outer portion of the ring piece in the radius direction is securely prevented from opening outward.

According to the present invention, a concave and convex portion in a comb-teeth shape is provided on an inner circumferential surface of the inertia mass element by forming the inertia mass element by laminating the annular plates with different inner diameters, the support means is formed to be an annular element, and a concave and convex portion fitted to the aforesaid concave and convex portion with a clearance existing between them is formed on an outer circumferential surface of the annular element, and then the said annular element is fixed at the position in the axial direction in the case with a spacer, a fixed groove or the like, the inertia mass element can be supported rotatably in the circumferential direction in the axial direction and the diameter direction by the support means, thus making it possible to omit the thrust bearings and the work for the mounting holes thereof. Further, when the annular element is formed to be the annular element having the width to abut to the inner surface at both sides in the axial direction of the case, the work for the spacer and the fixed groove can be omitted, which is more preferable.

A concave and convex portion in a comb-teeth shape may be provided on an inner circumferential surface of the inertia mass element by forming the inertia mass element by laminating the annular plates with different outer diameters, the support means may be formed to be an annular element, and a concave and convex portion fitted to the concave and convex portion of the inertia mass element with a clearance existing between them may be formed on an inner circumferential surface of the annular element, a remaining concave and convex portion of the annular element except for at least one concave portion or convex portion may be made to have a large clearance from the concave and convex portion of the inertia mass element to which the remaining concave and convex portion is fitted.

In doing so, as described above, by fixing the aforesaid annular element at the position in the axial direction inside the case with a spacer, a fixing groove or the like, the inertia mass element can be supported rotatably in the circumferential direction with the support means in the axial direction and the diameter direction, and the thrust bearings can be omitted, and the work for the mounting holes can be omitted. The work for the spacer and the fixing groove can be omitted by forming the aforesaid annular element to be an annular element having the width to abut to the inner surface at both sides in the axial direction of the aforesaid case, which is more preferable. Further, a suitable clearance to cause a desired damping force by the damping liquid existing in the clearance can be formed between the remaining concave and convex portion of the support means and the concave and convex portion of the inertia mass element to which the remaining concave and convex portion is fitted, and addition of the damping force is made possible.

According to the present invention, convex portions in a radial direction can be formed on outer surfaces of annular plates at both sides in the axial direction of the inertia mass element, and grooves in a radial direction can be formed on outer surfaces of the annular plates at both sides in the axial direction of the inertia mass element to be inclined to a tip end side in the revolving direction. In doing so, the degree of freedom of adjustment of the damping force is increased. Further, the case may be fixed to the revolving shaft of the internal combustion engine via a hub having an annular fixing portion to which the annular case body is mounted. If the mounting portion is not formed integrally with the case body like this, formation of the case body is facilitated.

BRIEF DESCRIPTION OF DRAWINGS

FIG. 10 is a sectional view (a) showing a mounting method before improved of a cover to a case body of the viscous damper of the present invention, and a sectional view (b) after improvement;

FIG. 11 is a sectional view showing bonding of the annular plates to each other by a pin usable in the present invention.

BEST MODE FOR CARRYING OUT THE INVENTION

Embodiments of the present invention will be explained in detail below based on the drawings.

Figure 1:
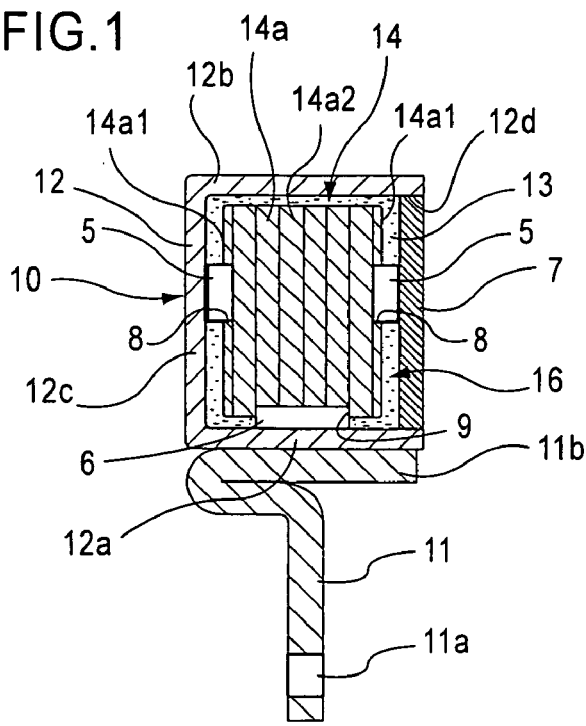
FIG. 1 is a sectional view showing an essential part of one embodiment of a viscous damper of the present invention.
Figure 2:
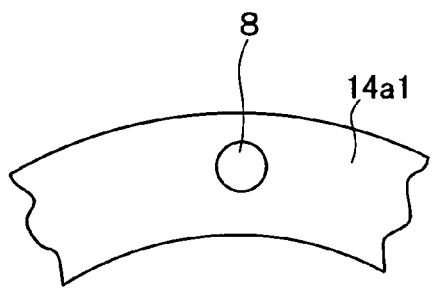
FIG. 2 is a plan view showing one part of annular plates at both sides of an inertia mass element of the viscous damper in FIG. 1.

FIG. 1 is a sectional view showing an essential part of one embodiment of a viscous damper of the present invention, and FIG. 2 is a plan view showing a part of an annular plate used in an inertia mass element of the damper in FIG. 1. In this embodiment, the viscous damper is constituted of a case 10 in which an opening 12d toward one side, in an axial direction, of an annular case body 12 substantially U-shaped in section is closed with a cover 7 to be liquid-sealed, an annular inertia mass element 14 housed with a damping liquid 16 inside the case 10, and a hub 11 for fixing the case 10 to a revolving shaft of an internal combustion engine, for example, a crankshaft (not shown) of an automobile engine.

A hub 11 is made by pressing a plate material to have an annular fixing portion 11b at an outer circumference, and is attached to a revolving shaft of an internal combustion engine via a mounting hole 11a provided near a center in its diameter direction, and the case body 12 is attached to an annular fixing portion 11b at the outer circumference. The case body 12 is fitted to the annular fixing portion 11b at the outer circumference of the hub 11, and by welding the case body 12 and the annular fixing portion 11b in the circumferential direction at positions of both sides in the axial direction, the case body 12 is fixed to the annular fixing portion 11b.

In the case 10 with the opening 12d of the case body 12 being closed with the cover 7, a closed chamber 13 substantially rectangular in section is defined inside by an inner circumferential wall 12a, an outer circumferential wall 12b, and an orthogonal wall 12c for connecting them of the case body 12 and the cover 7. The inertia mass element 14 is placed inside the closed chamber 13 rotatably in the circumferential direction with both sides in its axial direction being supported by thrust bearings 5 and an inner circumferential surface of the inertia mass element 14 being supported by a journal bearing 6.

The thrust bearings 5 are each constituted of a disc of a material with lubricity such as a nylon resin, and are attached to shallow mounting holes 8 formed on surfaces of both sides in the axial direction of the inertia mass element 14. The thrust bearings 5 abut to an inner surface of the orthogonal wall 12c of the case 12 and an inner surface of the cover 7, and support the inertia mass element 14 rotatably in a circumferential direction with a fixed narrow clearance being kept from these inner surfaces. The journal bearing 6 is an annular ring made of a nylon resin or the like, and is formed to be an open ring cut at one spot in a circumferential direction. The journal bearing 6 is attached to a shallow annular concave groove 9 provided at an inner circumferential portion of the inertia mass element 14, and is fitted onto the inner circumferential wall 12a of the case body 12. The journal bearing 6 abuts to the inner surface of the inner circumferential wall 12a of the case body 12, and supports the inertia mass element 14 rotatably in the circumferential direction with a fixed narrow clearance being kept from the inner surface.

The inertia mass element 14 is a laminate made by overlaying annular plates 14a on each other and bonding them, and thin annular plates 14a1 located at both sides in an axial direction are provided with the aforesaid mounting holes 8 by punching. An annular plate 14a2 located in a center part in a width direction (axial direction) of the inertia mass element 14 has an inner diameter made a little smaller than the other annular plates 14a and 14a1, whereby the aforesaid concave groove 9 is formed on an inner circumferential portion of the inertia mass element 14.

The case body 12 can be formed by cold forging of a plate material or by pressing work of a plate material. As the plate material, a cold-rolled steel plate defined by Japanese Industrial Standard JIS G3141 or a steel strip SPCC (for general purpose), SPCD (for drawing), SPCE (for deep drawing) and the like can be used. Use of a plate material with a sufficiently smooth surface in practical use, such as the above-described plate material, eliminates the need of finishing the surface by grinding.

In order to form the inertia mass element 14 by bonding the annular plates 14a (including the annular plates 14a1 and 14a2) to each other, an adhesive can be used, but as will be described later, by forming bonding pieces on the annular plates 14a and pressing the laminate of the annular plates, the annular plates can be mechanically bonded to each other with the bonding pieces. The annular plate 14a itself can be formed by pressing work of a plate material. As for the pressing work of the annular plate 14a, the annular plate may be punched out in its entirety, or arc-shaped ring pieces, which are a plurality of divided parts of the annular plate in its circumferential direction, may be punched out, while at the same time, engaging pieces are formed at the ring pieces, and the ring pieces may be bonded at the engaging pieces by a press to form the annular plate. As the plate material, SPCC, SPCD, SPCE and the like can be used. Use of a plate material with a sufficiently smooth surface in practical use, such as the above-described plate material, eliminates the need of finishing the surface by grinding.

According to the viscous damper of this embodiment, a plurality of annular plates 14a are laminated to form the inertia mass element 14, and therefore the mass of the inertia mass element can be adjusted by increasing and decreasing the number of annular plates 14a to be laminated and by increasing and decreasing the thickness of the annular plate. By applying pressure to the inertia mass element in the thickness direction by a press, the inertia mass element 14 having high dimensional precision can be obtained. Accordingly, the mass adjustment of the inertia mass element 14 corresponding to the vibration characteristic of the internal combustion engine to which the inertia mass element is applied can be facilitated, thus making the viscous damper high in general versatility. The mass adjustment of the inertia mass element 14 can be also easily realized by using the annular plates with different specific gravities.

The mounting holes 8 of the inertia mass element 14 in which the thrust bearing 5 is fitted can be formed by a simple work of punching of the annular plates 14a1 at both sides of the inertia mass element 14. The concave groove 9 in which the journal bearing 6 is fitted can be easily formed by reducing the inner diameter of the annular plates 14a2 in the center part of the inertia mass element 14. The hub 11 for mounting is separately provided instead of integrally forming the mounting portion at the case body 12 to fix the case 10 to the revolving shaft of the internal combustion engine, and therefore the case body 12 can be easily formed.

Figure 3:
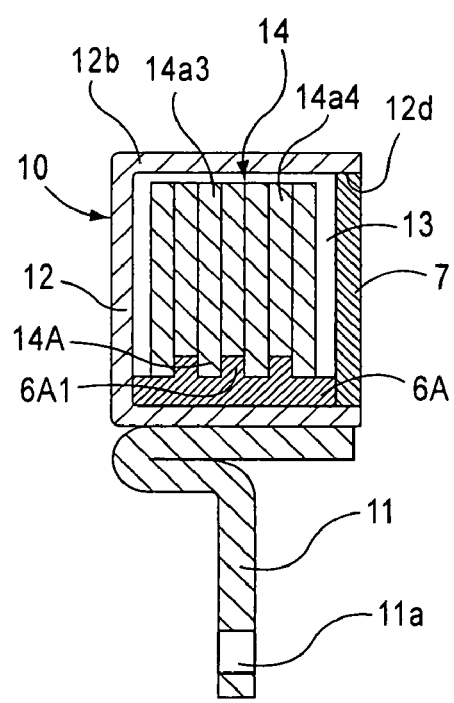
FIG. 3 is a sectional view showing an essential part of another embodiment of the present invention.

FIG. 3 shows another embodiment of the present invention. In this embodiment, the inertia mass element 14 is formed by alternately laminating annular plates 14a3 and 14a4 with different inner diameters, and a concave and convex (difference in level) 14A in a comb-teeth shape is provided in an inner circumferential surface of the inertia mass element 14. A journal bearing 6A is made to be an annular element with a concave and convex 6A1 on an outer circumferential surface thereof, the concave and convex 6A1 being fitted to the concave and convex 14A with a narrow clearance existing between them, whereby the bearing 6A is given an original function of supporting the inertia mass element 14 in a diameter direction. The bearing 6A is also given the width to abut to inner surfaces at both sides in the axial direction of the case 10, namely, an inner surface of the orthogonal wall 12c of the case body 12 and an inner surface of the cover 7, and therefore, is given a function of the thrust bearing for supporting the inertia mass element 14 in the axial direction.

In this embodiment, the inertia mass element 14 can be supported rotatably in a circumferential direction by one bearing 6A, in an axial direction and a diameter direction of the inertia mass element, and the work for the thrust bearing and the mounting hole can be eliminated.

Figure 4:
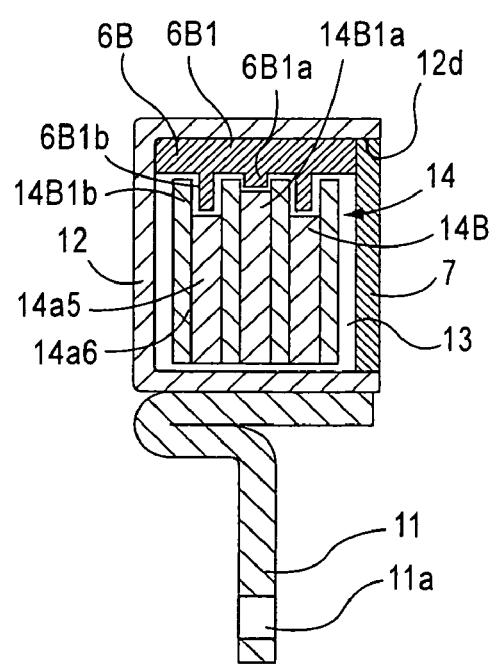
FIG. 4 is a sectional view showing an essential part of still another embodiment of the present invention.

FIG. 4 shows yet another embodiment of the present invention. In this embodiment, the inertia mass element 14 is formed by alternately laminating annular plates 14a5 and 14a6 with different outer diameters, so that a concave and convex portion 14B in a comb-teeth shape is provided on an outer circumferential surface of the inertia mass element. In order to give a journal bearing 6B an original function of supporting the inertia mass element 14 in a diameter direction, a concave and convex 6B1 fitted to the aforesaid concave and convex portion 14B with a clearance existing between them is formed on an inner circumferential surface of the bearing 6B. The bearing 6B is given the width to abut to inner surfaces at both sides in the axial direction of the case 10, so that the bearing 6B is given the function of a thrust bearing for supporting the inertia mass element 14 in the axial direction.

In this situation, a clearance between at least one of the concave and convex 6B1 of the bearing 6B, that is, the concave and convex portion 6B1b at both sides except for a convex portion 6B1a in a center in this example, and the concave and convex portion 14B1b of the inertia mass element 14 to which the concave and convex portion 6B1b is fitted is made comparatively large, whereby the clearance between the concave and convex portions 6B1b and 14B1b becomes a clearance suitably adjusted so that a desired damping force occurs by a damping liquid 16 existing in the clearance. When the shaft with the viscous damper being mounted thereon is revolved, and the damping liquid 16 is rotated with the rotation of the case 10, the damping liquid 16 concentrates in a direction of an outer circumference in the closed chamber 13 by a centrifugal force, and enters the clearance between the above-described concave and convex portion 6B1b and concave and convex portion 14B1b to cause a strong damping force. Accordingly, in this embodiment, as compared with the viscous damper in FIG. 1 in which the concave and convex portion is not provided between the inertia mass element 14 and the bearing 6B placed at the outer circumferential side of the inertia mass element 14, a stronger damping force can be added.

A clearance between the convex portion 6B1a at a center of the above-described bearing 6B and the concave and convex portion 14B1a at the center of the inertia mass element 14 to which the convex portion 6B1a is fitted is made a narrow clearance to be given the supporting function in a diameter direction and an axial direction.

Figure 5:
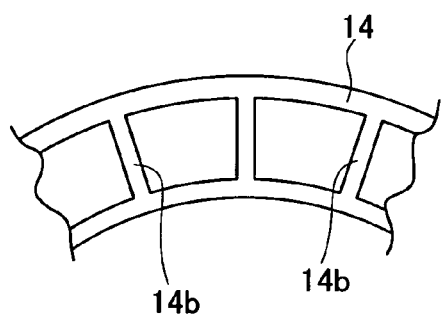
FIG. 5 is a plan view showing an annular plate provided with convex portions usable in the inertia mass element of the viscous damper of the present invention.

In the present invention, convex portions 14b in a radial direction can be formed on an outer surface of the annular plates 14a located at both sides in the axial direction of the inertia mass element 14 as shown in FIG. 5. By providing such a convex portion 14b, clearances from inner surfaces at both sides in the axial direction of the case 10 can be adjusted, and the degree of freedom of adjustment of the damping force is increased. The function of an oil reservoir can be added to the surface of the inertia mass element 14. Namely, the viscous damper is generally used with the case 10 being positioned vertically due to the placement position of the internal combustion engine, and therefore a damper liquid in the closed chamber 13 descends in a standstill state. If the convex portions 14b are formed on the surface of both sides of the inertia mass element 14, the descending damping liquid is easily held on the surface. Consequently, it becomes possible to exhibit a damping force in a short time after the internal combustion engine is actuated.

Figure 6:
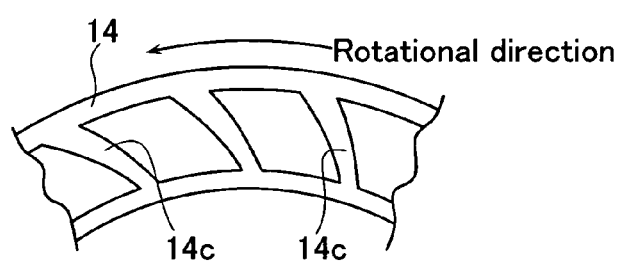
FIG. 6 is a plan view showing an annular plate provided with a groove usable in the inertia mass body of the viscous damper of the present invention.

At the annular plates 14a at both sides of the inertia mass element 14, grooves 14c in a radial direction can be provided on their outer surface to be inclined to a tip end side in a rotational direction as shown in FIG. 6. If such grooves 14c are provided, flow of the damping liquid can be changed, and therefore it becomes possible to adjust the damping force. The damping liquid leaning in the outer circumferential direction by a centrifugal force when the inertia mass element 14 is rotated, can be guided in a center direction by the slantly disposed groove 14c, and therefore it is especially effective in the case in which the journal bearing is provided at a center side of the inertia mass element 14. The convex portions 14b and the groove 14c of the annular plates 14a can be formed at the same time when the annular plates 14 are made by a press.

Figure 7:
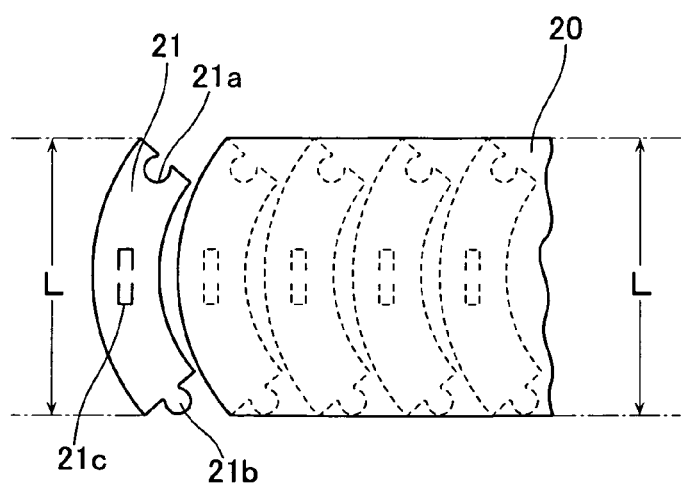
FIG. 7 is a plan view showing a ring piece used for the annular plate of the inertia mass element of the viscous damper of the present invention.

The annular plate 14a of the inertia mass element 14 may be punched out in its entirety by a press, but it is preferred that a plurality of parts are assembled to form the annular plate. As shown in FIG. 7, arc-shaped ring pieces 21, which are a plurality of divided parts of the annular plate in the circumferential direction, for example, four or five parts, are punched out from the long plate material 20, and at the same time, by this stamping, protruded pieces 21b are formed on the ring pieces 21 at one end, and fitting holes 21a fitted to the protruded pieces 21b are formed at the other end. A plurality of ring pieces 21 are arranged in the circumferential direction to be placed in an annular form, the protruded piece 21b of one of the adjacent ring pieces 21 is applied to the hole 21a of the other ring piece 21, so that the end portions of the ring pieces 21 and 21 butt against each other, and the butted end portions are pressed to close-fit the protruded piece 21b into the hole 21a, whereby a plurality of ring pieces 21 are joined and formed into the annular plate.

If the ring pieces 21 are thus punched out of the plate material 20, as many the ring pieces 21 as possible, each of which has a predetermined linear length L, are taken from the plate material 20 having the same width L or more, whereby waste of the material can be substantially eliminated.

Figure 8A:
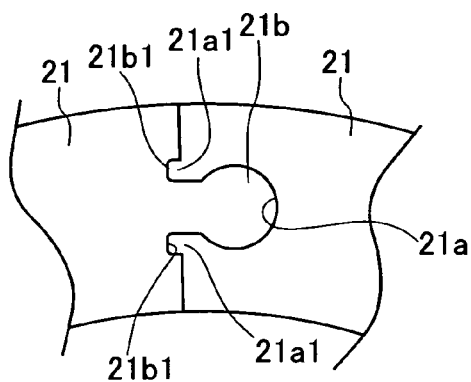
FIG. 8 is a plan view (a) showing an improved joining portion by close-fitting for joining the ring pieces in FIG. 7 to each other, and a plan view (b) showing a joining portion before improved.
Figure 8B:
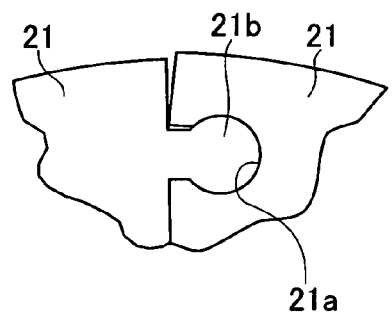

On close-fitting of the protruded piece 21b and the hole 21a, the hole 21a is forced to expand by the protruded piece 21b, and therefore the part around the hole 21a of the ring piece 21 is deformed in the radius direction, and the outer part of the hole 21a in the radius direction especially tends to open outward as shown in FIG. 8(b). Preferably, rectangular concave portions 21b1 are provided at both sides of a base part of the protruded piece 21b of the ring piece 21 as shown in FIG. 8(a), and rectangular convex portions 21a1 fitted into the concave portions 21b1 are provided at both sides of an open end of the hole 21a of the ring piece 21. If the concave portions 21b1 at the both sides of the base part of the protruded piece 21b of the ring piece 21, and the convex portions 21a1 at the both sides of the open end of the hole 21a of the ring piece 21 are fitted to each other, deformation can be pressed down and absorbed at the spot of the fitting portion of the convex portions 21a1 and the concave portions 21b1, and therefore the outer part of the hole 21a in the radius direction can be surely prevented from opening outward.

The concave portions 21b1 at a base portion of the protruded piece 21b and the convex portion 21a1 at the open end of the hole 21a may be formed only at an outer portion which easily opens. It is preferred that the concave portions 21b1 and the convex portion 21a1 are rectangular, because the rectangular shape provides a strong engaging force, but they may be formed to be circular and the like other than rectangular.

There is the case in which the annular plate 14a is pressed in the thickness direction to secure the dimension of the annular plate 14, and in this case, an expanding force is applied to the ring piece 21, but if the fitting portions of the convex portions 21a1 into the concave portions 21b1 are provided, excellent shape retainability of the ring pieces 21 is provided.

An adhesive can be used to bond the laminated annular plates 14a, but in order to improve productivity, it is preferred to form engaging pieces at the annular plates 14a and bond them mechanically by a press. The engaging piece is shown in FIG. 7, and in this example, a half blanking work is performed for a center part of the arc of the ring piece 21, and two half-blanked pieces (cut-and-bent pieces) 21c are bent and raised from the surface of the ring piece 21 to protrude.

After the ring pieces 21 are joined and formed to be the annular plate 14a, a plurality of annular plates 14a are overlaid on each other so that the cut-and-bent pieces 21c are overlaid on each other. The laminate of the annular plates are pressed, and the cut-and-bent piece 21c of one of the overlaid annular plates is fitted into the hole portion of the cut-and-bent piece 21c formed at the other annular plate, whereby the annular plates are bonded to each other. The annular plates are bonded to each other in the close-contact state with substantially no clearance between them by deformation by a press.

It goes without saying that an annular plate with no joint, which is punched out in its entirety, may be used for the annular plate on which the cut-and-bent pieces are formed, instead of the annular plate made by joining the ring pieces, and for the annular plate with no joint, the cut-and-bent pieces are formed with spaces provided in the circumferential direction, and the laminate of the annular plates is similarly bonded by pressing.

Figure 9A:
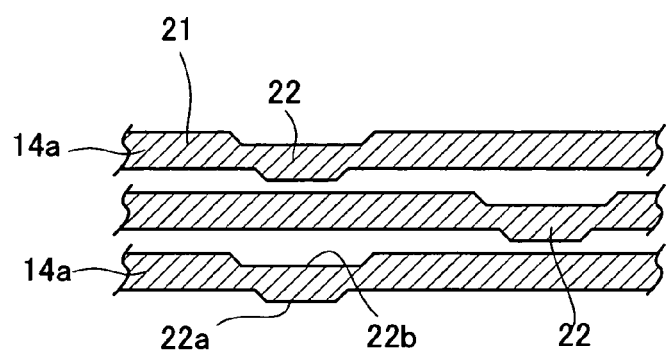
FIG. 9 is a sectional view (a) showing the annular plates bonded with dowels and an enlarged sectional view (b) of the dowel.
Figure 9B:
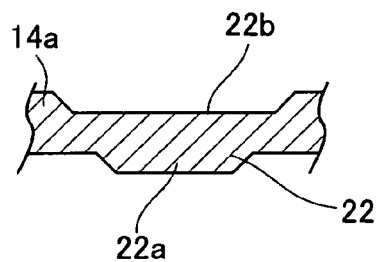
Figure 12:
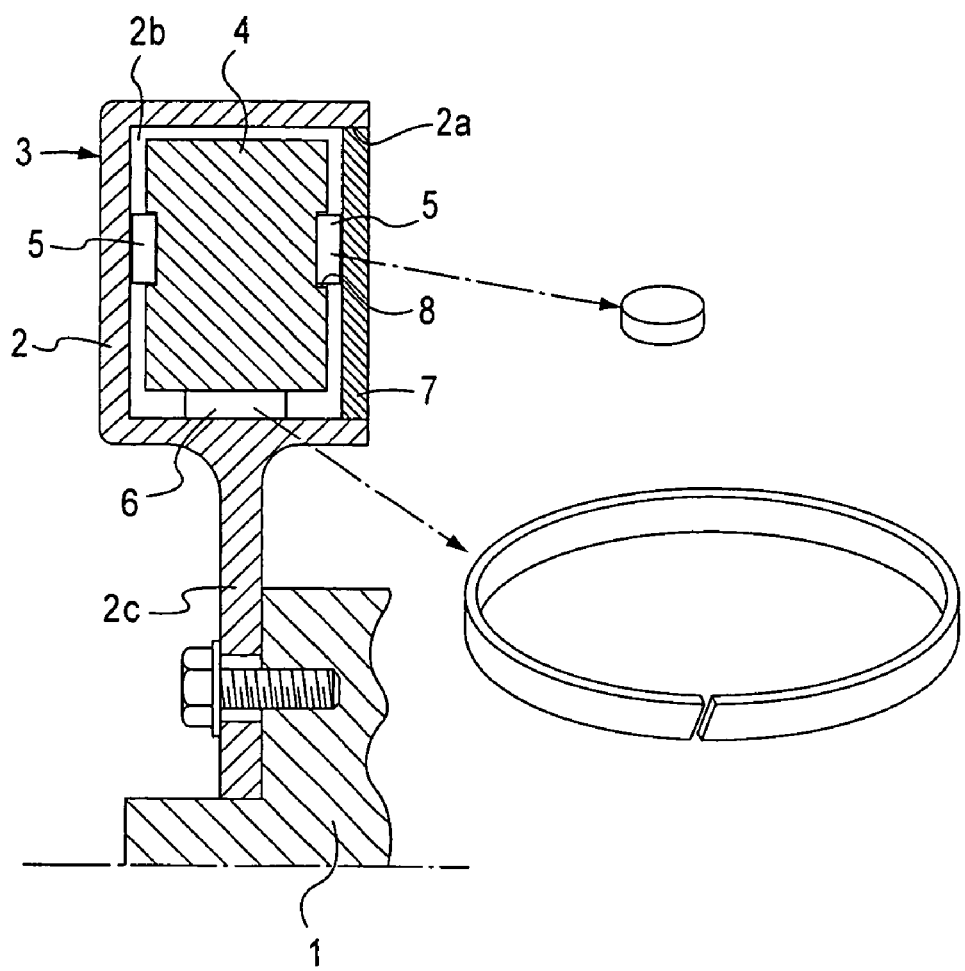
FIG. 12 is a sectional view showing a conventional viscous damper.

Further, as a bonding piece, a dowel may be formed to perform bonding. As shown in FIG. 9, a dowel 22 protruded from one surface of the ring piece 21 to the other surface is formed by a half pierce work by a press, and after the ring pieces 21 are joined to be formed into the annular plate 14a, a plurality of annular plates 14a are overlaid on each other so that the dowels 22 are displaced in the circumferential direction. It is preferred that the dowels 22 of every other annular plate 14a are overlaid on each other. Then, the laminate of the annular plates 14a is pressed, convex portions 22a of the dowels 22 of one of the overlaid annular plates 14a are bitten into the surface of the other annular plate 14a, whereby a plurality of annular plates 14a are bonded. The volume of the plate material of the opposed surface, which is squeezed out by the convex portion 22a of the dowel 22 biting in the opposed surface, moves to a concave portion 22b of the dowel 22 to fill the concave portion 22b, and does not move in the outer circumferential direction and the like, and therefore high precision of the outer diameter dimension is provided. This also bonds the circular plates 14a to each other in the close-contact state with substantially no clearance.

In this case, it is preferred to form the convex portion 22a of the dowel 22 to be narrower than the concave portion 22b. If the convex portion 22a is made narrower than the concave portion 22b, the convex portion 22a can be formed to be high by ejection by half-piercing work which obtains the convex portion 22a and the concave portion 22b at the same time. Accordingly, bite of the convex portion 22a into the surface of the annular plate 14 is sharpened, which increases the engaging force, and bonding strength of the annular plates to each other becomes high. The shape stability of the obtained inertia mass element 14 is improved.

It goes without saying that the annular plate with the dowels being formed may be an annular plate with no joint, which is punched out in its entirety, instead of the annular plate made by joining the ring pieces. For the annular plate with no joint, the dowels are formed with spaces provided in the circumferential direction, and the laminate of the annular plates is similarly bonded by pressing.

According to the present invention, bonding by means of pins, screws and the like may be performed in addition to or instead of the bonding by means of the dowels and the like of the annular plates 14a. A bonding method by means of the pins is shown in FIG. 11. Pin holes 24a are formed at a plurality of spots in the circumferential direction of the annular plate 14a. The annular plate 14a may be the one which is punched out in its entirety by a press as the conventional ones, or may be the one which is made by punching out the arc-shaped ring pieces and bonding them, and on the punching of them, or after the punching, a hole 24 is formed by pressing. A plurality of annular plates 14a are overlaid on each other so that the pin holes 24 are overlaid on each other, a pin 25 having conical concave portions 25a at its both ends is inserted into the pin hole 24 of the laminate of the annular plates 14a, choking jigs (not shown) of substantially the same shape are applied to the concave portion 25a at the both ends and pressed, and the pin 25 is choked by pressing the concave portions 25a to expand from the state shown by the chain double-dashed line to the state shown by the solid line, whereby the laminated annular plates 14a are bonded.

In this case, in order to prevent the end portions of the pin 25 from protruding outward from the laminate of the annular plates 14a, it is preferred to expand the diameter of the open ends 24a of the pin hole 24 of the circular plates 14a located at the outermost layer to an outside by chamfering or the like to make it possible to absorb deformation margin of the end portions of the pin 25. If the pin 25 is somewhat made shorter, the deformation margin is not always necessary.

The viscous damper may be directly mounted on the revolving shaft of the internal combustion engine by integrally providing the mounting portion at the case body 12, but as described above, it is mounted on the revolving shaft via the hub 11 by fixing the case body 12 at the hub 11 having the annular fixing portion 11b at the outer circumference. As shown in FIG. 10, the case body 12 is joined to the annular fixing portion 11b of the hub 11 by applying welding 15a, 15b in the circumferential direction to the inner circumferential wall 12a of the case body 12 and the annular fixing portion 11b at the positions of both sides in the axial direction, after it is fitted to the outer circumferential portion of the annular fixing portion 11b of the hub 11. If the strength allows, spot welding can be performed.

The cover 7 for closing the open portion 12d of the case body 12 is also joined to the open end by welding as shown in FIG. 10(a) or FIG. 10(b). FIG. 10(a) is the similar mounting method as in the prior art. Joggling work is applied to the open end portions of the inner circumferential wall 12a and the outer circumferential wall 12b of the case body 12 to provide inner and outer step portions 12e made by cutting the inner surfaces of the open end portions, and upper and lower ends of the cover 7 are fitted in the inner and outer step portions 12e, welding 15c (FIG. 10 shows only the upper side) for the entire circumference in the circumferential direction is applied to abutting portions of the upper and lower ends of the cover 7 and the outer circumferential wall 12b and the inner circumferential wall 12a of the case body 12 to join the cover 7 to the open end of the case body 12 to be liquid-sealed.

FIG. 10(b) shows an improved mounting method. A tip end of the annular fixing portion 11b of the hub 11 is protruded from the open end of the case body 12, the cover 7 is placed on the protruded tip end of the annular fixing portion 11b, so that the cover 7 is applied to the open end of the case body 12, welding 15d and welding 15e are applied in the circumferential direction to the entire circumference of the abutting portions of the upper and lower ends of the cover 7 and the outer circumferential wall 12*b* and the inner circumferential wall 12*a* of the case body 12 to join the cover 7 to the open end of the case body 12 to be liquid sealed, and by welding 15*e* of the lower end of the cover 7 and the inner circumferential wall 12*a* of the case body 12, the open end of the case body 12 and the annular fixing portion 11*b* of the hub 11 are joined to each other at the same time. As for the above-described welding, it is preferable to use beam welding, laser welding and the like.

According to the above mounting method, it is not necessary to perform welding of the lower end of the cover 7 and the inner circumferential wall 12*a* of the case body 12, and welding of the open end of the inner circumferential wall 12*a* of the case body 12 and the annular fixing portion 11*b* of the hub 11 separately, labor-saving is achieved in the welding work.

As explained so far, according to the viscous damper of the present invention, the annular inertia mass element housed inside the case with the damper liquid is constructed by overlaying a plurality of annular plates and bonding them, and therefore the mass adjustment of the inertia mass element can be facilitated by increasing and decreasing and the like of the number of laminated annular plates, and general versatility of the viscous damper can be further improved.

The invention claimed is:

1. A viscous damper comprising a case with an opening toward one side in an axial direction of an annular case body substantially U-shaped in section being closed with a fixed cover to be liquid-sealed, an annular inertia mass element housed with a damping liquid inside said case, and support means for supporting said inertia mass element in a circumferential direction inside said case, wherein said inertia mass element is comprised of a laminate of annular plates, each plate being formed of arc-shaped ring pieces bonded together in a circumferential direction and a width direction, in which a protruded piece or a fitting hole in the circumferential direction fitted to the protruded piece is formed at one end of each said arc-shaped ring piece, said hole or said protruded piece is formed at the other end of said arc-shaped ring piece, a concave portion is formed at both sides of a base portion of said protruded piece, and a convex portion fitted in the concave portion is formed at an open end of said hole.

2. The viscous damper according to claim 1, said arc-shaped ring pieces are bonded in a circumferential direction by close-fitting the protruded piece of one of arc-shaped ring pieces adjacent in a circumferential direction into the hole of the other one of the adjacent arc-shaped ring pieces.

3. The viscous damper according to claim 1 or 2, wherein a cut-and-bent piece is formed on a surface of said arc-shaped ring piece, and arc-shaped ring pieces are bonded in a width direction by overlaying arc-shaped ring pieces adjacent in a width direction so that the arc-shaped ring pieces are overlaid on each other with a pressing force.

4. The viscous damper according to claim 1, wherein said case is fixed via a hub having an annular fixing portion to which said annular case body is mounted.

* * * * *